United States Patent
Wu et al.

(10) Patent No.: US 7,474,785 B2
(45) Date of Patent: Jan. 6, 2009

(54) VIDEO AUTO ENHANCING ALGORITHM

(75) Inventors: Donghui Wu, Fremont, CA (US); Min Cheng, Zhejiang (CN); Wenhua Zhao, Zhejiang (CN); Yiqing Jin, Zhejiang (CN)

(73) Assignee: ArcSoft, Inc., Fremont, CA (US)

( * ) Notice: Subject to any disclaimer, the term of this patent is extended or adjusted under 35 U.S.C. 154(b) by 914 days.

(21) Appl. No.: 10/895,875

(22) Filed: Jul. 20, 2004

(65) Prior Publication Data

US 2006/0018537 A1    Jan. 26, 2006

(51) Int. Cl.
*G06K 9/00* (2006.01)
*G06K 9/40* (2006.01)

(52) U.S. Cl. .................................... 382/168; 382/274

(58) Field of Classification Search ................ 382/167, 382/168, 169, 274
See application file for complete search history.

(56) References Cited

U.S. PATENT DOCUMENTS

| | | | | |
|---|---|---|---|---|
| 6,463,173 | B1 * | 10/2002 | Tretter | 382/168 |
| 7,359,572 | B2 * | 4/2008 | Liu et al. | 382/274 |
| 7,406,193 | B2 * | 7/2008 | Watanabe | 382/168 |
| 2004/0202385 | A1 * | 10/2004 | Cheng et al. | 382/305 |

* cited by examiner

*Primary Examiner*—Duy M Dang
(74) *Attorney, Agent, or Firm*—Patent Law Group LLP; David C. Hsia

(57) ABSTRACT

A method for enhancing a video includes applying a linear histogram stretch, a gamma correction, and sigma row, column, and temporal filters to the video.

23 Claims, 3 Drawing Sheets

VIDEO AUTO ENHANCING ALGORITHM

FIELD OF INVENTION

This invention relates to methods for enhancing video.

DESCRIPTION OF RELATED ART

Digital video cameras commonly employ CMOS or CCD image sensors to capture digital video. In poor lighting, the digital video is often dark and typically includes video noise that appears as graininess, fuzz, snow, or dancing specks. This is because in the limited time allotted to each frame, the image sensors may not have sufficient time for a proper exposure to capture the frame. Thus, what is needed is a method that enhances the video to improve brightness and reduce video noise.

BRIEF DESCRIPTION OF THE DRAWINGS

Use of the same reference numbers in different figures indicates similar or identical elements.

SUMMARY

In one embodiment of the invention, a method for enhancing a video includes determining a difference in histogram properties between a preceding frame and a current frame, and applying a linear histogram stretch to the current frame with parameters determined for the current frame if the difference is less than a first threshold. The method further includes applying the linear histogram stretch to the current frame with the current parameters if the difference is less than a second threshold and the change in one of the parameters between the frames is less than a third threshold. Otherwise the method includes applying the linear histogram stretch to the current frame with parameters determined for the preceding frame.

In one embodiment of the invention, a method for enhancing a video includes applying a gamma correction to a current frame with an optimal gamma that maximizes the entropy of the current frame. The optimal gamma parameter is determined by searching in a range based on the change in the mean value of brightness between a preceding frame and the current frame.

In one embodiment of the invention, a method for enhancing video includes applying a sigma row filter to a pixel in a current frame based on the brightness of an adjacent pixel in the same row in the current frame, applying a sigma column filter to the pixel based on the brightness of an adjacent pixel in the same column in the current frame, applying a sigma temporal filter to the pixel based on the brightness of an adjacent pixel at the same row and column in a preceding frame, and repeating the application of filters to each of the remaining pixels in the frame.

DETAILED DESCRIPTION

Figure 1:
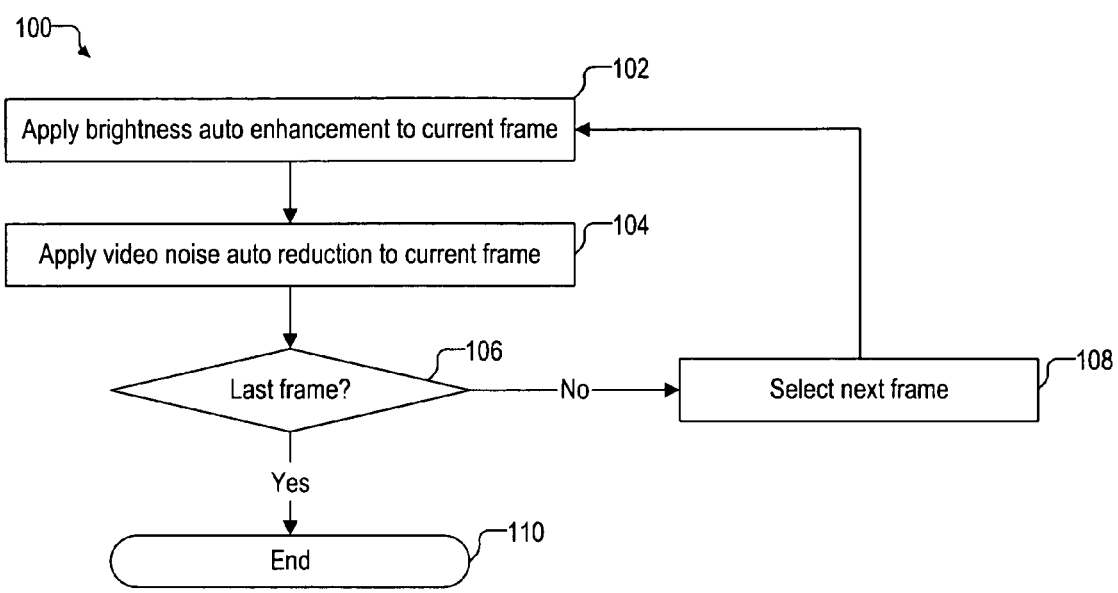
FIG. 1 is a flowchart of a method to enhance brightness and reduce video noise in a video in one embodiment of the invention.

FIG. 1 is a flowchart of a method 100 for enhancing a video in one embodiment of the invention. Method 100 is typically implemented with software on a general purpose computer and operates on a YCrCb color space.

In step 102, brightness enhancement is applied to the current frame. In one embodiment, the brightness enhancement includes a linear histogram stretch as described later in reference to FIG. 2, and a gamma correction as described later in reference to FIG. 3. After brightness enhancement, the current frame is passed to the next process.

In step 104, video noise reduction is applied to the current frame to suppress video noise that is enhanced along with the brightness in step 102. In one embodiment, the video noise reduction includes sigma filtering as described later in reference to FIG. 4.

In step 106, it is determined if the last frame of the video has been reached. If not, step 106 is followed by step 108. If the last frame has been reached, then step 106 is followed by step 108 that ends method 100.

In step 108, the next frame in the video is selected for processing. Step 108 is followed by step 102 and method 100 repeats until the entire video has been processed.

Figure 2:
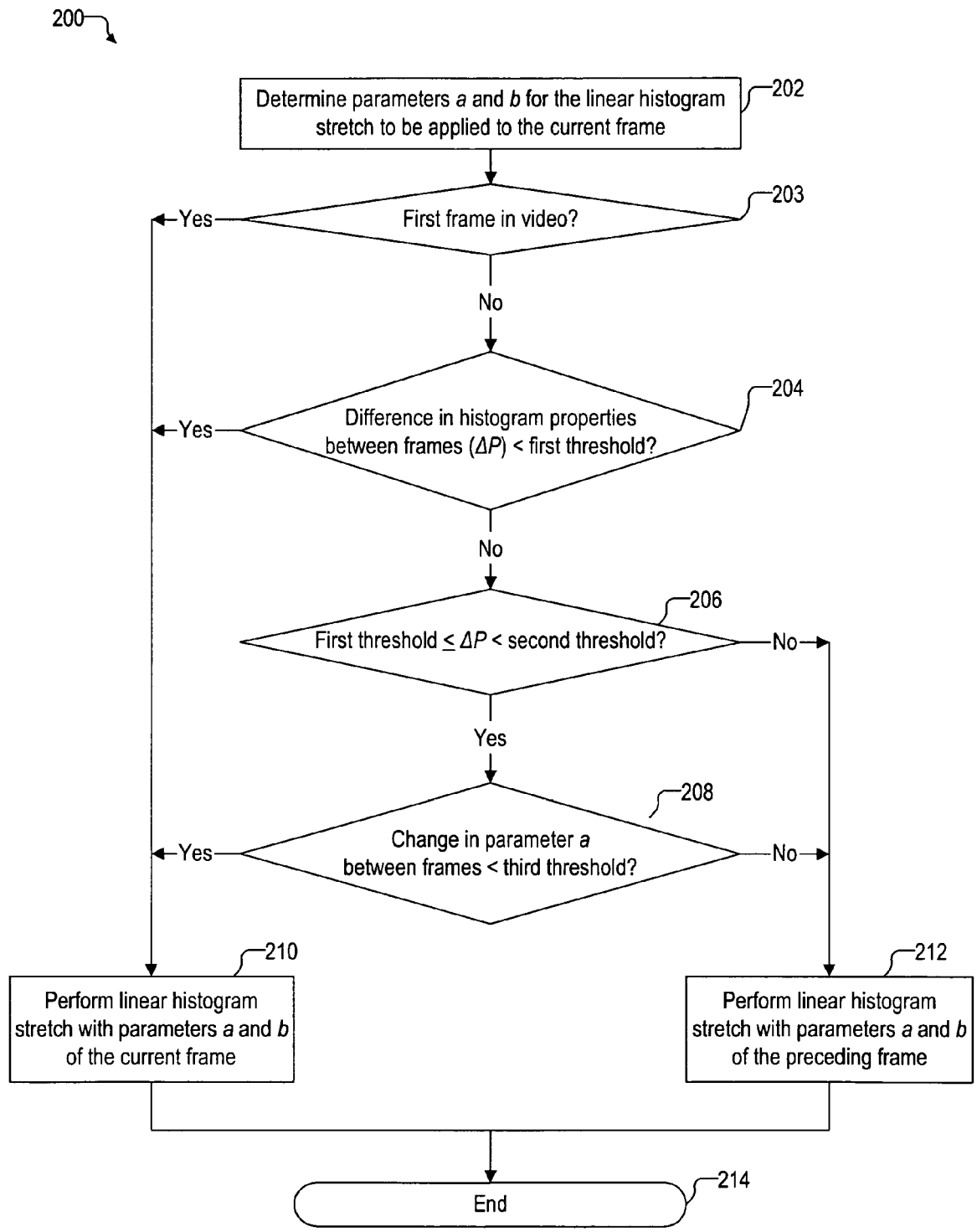
FIG. 2 is a flowchart of a linear transformation method to enhance brightness in a video in one embodiment of the invention.

FIG. 2 is flowchart of a linear histogram stretch method 200 for enhancing the brightness of a frame in the video in one embodiment of the invention.

In step 202, the parameters of the linear histogram stretch to be applied to the current frame are determined. The parameters of the linear histogram stretch are determined as follows:

$$a = \frac{255}{\max - \min}, \quad (1)$$

$$b = -a \cdot \min, \quad (2)$$

where a and b are the parameters for the linear histogram stretch, max is a maximum brightness above which pixels in a frame are set to a maximum brightness (e.g., 255), and min is a minimum brightness below which pixels in the frame are set to a minimum brightness (e.g., 0). In one embodiment, max is set so that 1% of the total number of pixels in the frame will be set to 255, and min is set so that 1% of the total number of pixels in the frame will be set to 0.

The linear histogram stretch is defined as follows:

$$Y = a \cdot Y_0 + b, \quad (3)$$

where Y is the new brightness (i.e., luminance) of a pixel in a frame, and $Y_0$ is an original brightness of the pixel. The linear histogram stretch is applied to each pixel in the frame.

Conventionally, parameters a and b are calculated for each frame. This may cause the brightness of the frames to vary noticeably to the viewers (e.g., appearing as sharp flashes in the video). Thus, the following steps are implemented to subtly enhance the brightness of the frames.

In step 203, it is determined if the current frame is the first frame in the video. If so, step 203 is followed by step 210. Otherwise step 203 is followed by step 204.

In step 204, it is determined if the difference in histogram properties between the current frame and the preceding frame in the video is less than a first threshold. If the difference in histogram properties is less than the first threshold, then the brightness enhancement with parameters a and b determined for the current frame will preserve the continuity in brightness of the video. Otherwise parameters a and b determined for the preceding frame will be used.

In one embodiment, the difference in histogram properties is determined as follows:

$$\Delta P = |P_1 - P_0|/P_0, \quad (4)$$

where $\Delta P$ is the difference in the histogram properties, $P_1$ is the histogram property of the original current frame (i.e., without any enhancement), and $P_0$ is the histogram property of the original preceding frame (i.e., without any enhancement). The histogram property is defined as:

$$P = \sum_{j=o}^{255} p_j \cdot |j - \text{mean}|, \quad (5)$$

where P is the histogram property of a frame, $p_j$ is the total number of pixels with a brightness of j in a frame, and mean is the mean value of the brightness of the frame. The histogram property is the degree of histogram concentricity of a frame.

If $\Delta P$ is less than the first threshold, then step 204 is followed by step 210. Otherwise step 204 is followed by step 206. In one embodiment, the first threshold is 0.02.

In step 206, it is determined if $\Delta P$ is greater than or equal to the first threshold and less than a second threshold. If so, step 206 is followed by step 208. Otherwise step 206 is followed by step 212. In one embodiment, the second threshold is 0.2.

In step 208, it is determined if the difference in parameter a determined for the current frame and parameter a determined for the preceding frame is less than a third threshold. If so, then step 208 is followed by step 210. Otherwise step 212 is followed by step 212. In one embodiment, the third threshold is 0.15.

If the current frame satisfies the conditions of steps 206 and 208, then the brightness enhancement with parameters a and b determined for the current frame will preserve the continuity in brightness of the video. Otherwise parameters a and b determined for the preceding frame will be used.

In step 210, linear histogram stretch is applied to the pixels in the current frame with parameters a and b determined for the current frame. Unlike conventional linear histogram stretch, the other components of the color space are also stretched along with the brightness as follows:

$$Y = a \cdot Y_0 + b, \quad (3)$$

$$Cr = a \cdot Cr_0, \quad (6)$$

$$Cb = a \cdot Cb_0, \quad (7)$$

where Cr is the new red chrominance, $Cr_0$ is the original red chrominance, Cb is the new blue chrominance, and $Cb_0$ is the original blue chrominance. By stretching the other color components along with brightness, the color of the frame will not appear faded. Step 210 is followed by step 214, which ends method 200 for the current frame.

In step 212, linear histogram stretch is applied to the pixels in the current frame with parameters a and b determined for the preceding frame. Like step 210, the other components of the color space are also stretched along with the brightness. Step 212 is followed by step 214, which ends method 200 for the current frame.

Figure 3:
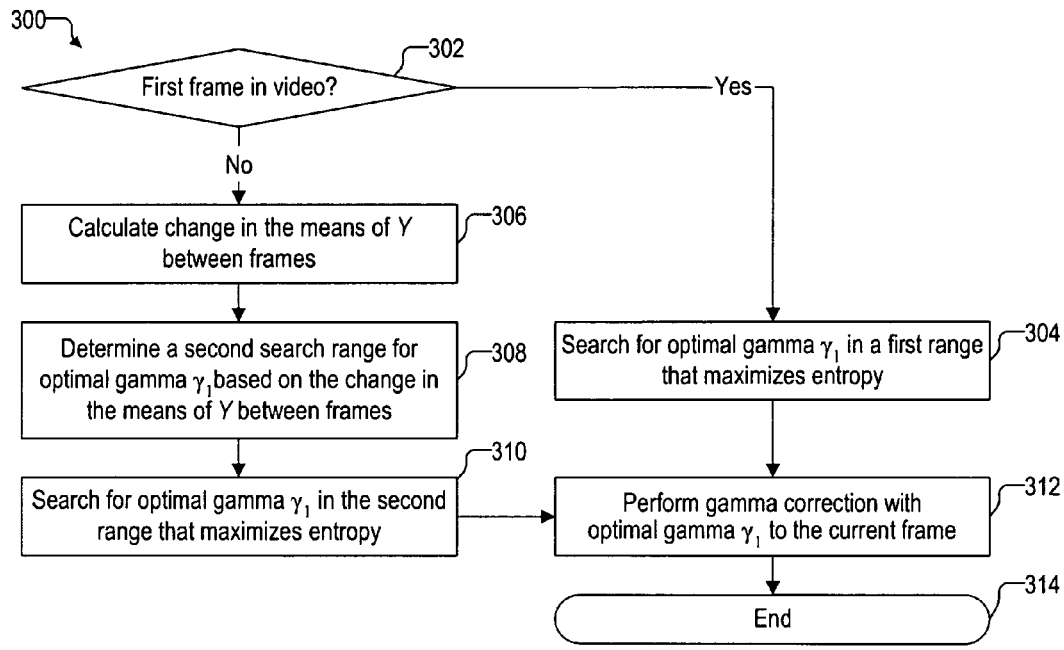
FIG. 3 is a flowchart of a nonlinear transformation method to enhance brightness in a video in one embodiment of the invention.

FIG. 3 is flowchart of a gamma correction method 300 for enhancing the brightness of a frame in the video in one embodiment of the invention.

In step 302, it is determined if the current frame is the first frame in the video. If so, step 302 is followed by step 304. Otherwise step 302 is followed by step 306.

In step 304, an optimal gamma that maximizes entropy of the current frame is determined. By maximizing the entropy of the current frame, the distribution of pixel gray levels will be optimized and the details hidden in shadows will be enhanced. In one embodiment, the entropy of an enhanced image can be defined as follows:

$$E = \sum_{j=l}^{255} P_j \cdot \gamma \cdot \left(\frac{j+1}{256}\right)^{\gamma - 1}, \quad (8)$$

where E is the entropy of the enhanced frame, j is a brightness level, $P_j$ is a percentage of pixels in the original frame having brightness j, and $\gamma$ is a variable gamma. In one embodiment, variable gamma $\gamma$ is varied in a range from 0.65 to 1.2 to search for the optimal gamma that maximizes the entropy of the current frame. Step 304 is followed by step 312.

Conventionally, the optimal gamma is calculated for each frame. This may cause the brightness of the frames to vary noticeably to the viewers (e.g., appearing as sharp flashes in the video). Thus, the following steps are implemented to subtly enhance the brightness of the frames.

In step 306, the difference in the mean value of the brightness between the current frame and the preceding frame is determined. The difference is determined as follows:

$$\Delta m = |m_1 - m_0|, \quad (9)$$

where $\Delta m$ is the difference in the mean value of the brightness between the two frames, $m_1$ is the mean value of the brightness in the current frame, and $m_0$ is the mean value of the brightness in the preceding frame. Step 306 is followed by step 308.

In step 308, a reduced range for variable gamma $\gamma$ is determined as follows:

$$[\gamma_0 - \Delta m \cdot 0.02, \gamma_0 + \Delta m \cdot 0.02], \quad (10)$$

where $\gamma_0$ is the optimal gamma determined for the preceding frame. Step 308 is followed by step 310.

In step 310, an optimal gamma within the reduced range that maximizes the entropy of the current frame is determined. Step 310 is followed by step 312.

In step 312, gamma correction is applied to the current frame with the optimal gamma. In one embodiment, gamma correction is applied as follows:

$$Y = 255 \cdot \left(\frac{Y_0}{255}\right)^{\gamma_1}, \quad (11)$$

where Y is the new brightness of a pixel in a frame, $Y_0$ is an original brightness of the pixel, and $\gamma_1$ is the optimal gamma for the current frame. Step 312 is followed by step 314, which ends method 300.

Figure 4:
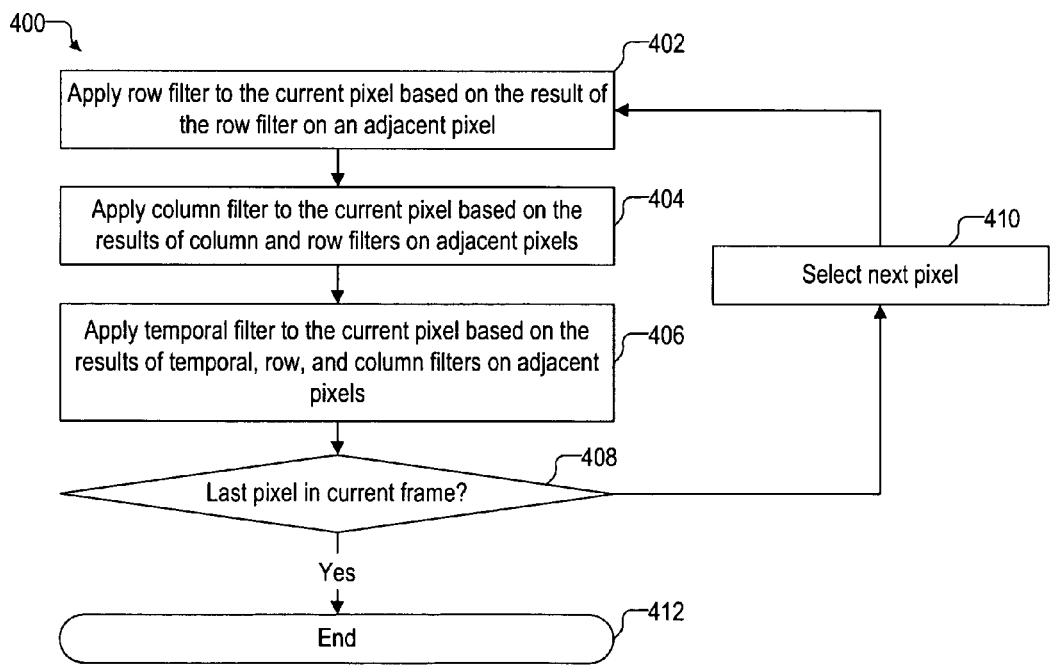
FIG. 4 is a flowchart of a filtering method to reduce video noise in s a video in one embodiment of the invention.

FIG. 4 is flowchart of a sigma filtering method 400 for reducing video noise in the video in one embodiment of the invention. A conventional three dimensional (3D) sigma filter can be applied to reduce image noise, sharpens regions, preserve edges, and retain thin lines. The conventional 3D sigma filter can be applied as follows:

$$v(x, y, z) = \frac{1}{Nc} \sum_{(l,m,n) \in Nc(x,y,z)} v(l, m, n), \quad (12)$$

where x and y are the horizontal and vertical coordinates of the pixel in a frame, z is the temporal coordinate of the pixel in the video, v is the new brightness of the pixel located at coordinates (x, y, z). Nc is the number of pixels (l,m,n) that satisfies the following conditions: (1) the pixel (l,m,n) is selected from a neighborhood N(x,y,z) of (2w+1)×(2h+1)×(2l+1) around (x,y,z); and (2) the brightness of pixel (l,m,n) is within a noise variance 2σ of the brightness of the pixel (x,y,z). Nc is mathematically defined as follows:

$$(l,m,n) \in Nc(x,y,z) \text{ if } (l,m,n) \in N(x,y,z) \text{ and } |v(l,m,n)-v(x,y,z)|<2\sigma, \quad (13)$$

To improve processing speed, the conventional 3D sigma filter has been separated along the three dimensions into a row filter, a column filter, and a temporal filter. Furthermore, only the pixels that have been previously processed are used to determine the new brightness of the pixel.

In step 402, a row filter is applied to the current pixel. The row filter is applied as follows:

$$v_1(x, y, z) = \begin{cases} [v_1(x-1, y, z) + v(x, y, z)]/2, & v(x-1, y, z) \in Nc(x, y, z) \\ v(x, y, z), & v(x-1, y, z) \notin Nc(x, y, z) \end{cases}, \quad (14)$$

$$v(l, m, n) \in Nc(x, y, z) \text{ if } |v(l, m, n) - v(x, y, z)| < 2\sigma, \quad (15)$$

where $v_1$ is the first new brightness of the pixel at (x, y, z) based on (1) the first new brightness of an adjacent pixel in the same row in the frame and (2) the original brightness of the pixel, and (x−1, y, z) are the coordinates of the adjacent pixel in the same row. In one embodiment, noise variance σ is 10.

In essence, the difference in brightness of the current pixel and the adjacent pixel in the same row is determined. If the difference is less than 2σ, then the average brightness of the current pixel and the adjacent pixel is set as the first new brightness of the pixel. Otherwise, the first mew brightness of the pixel is set equal to the original brightness of the pixel.

In step 404, a column filter is applied to the current pixel. The column filter is applied as follows:

$$v_2(x, y, z) = \begin{cases} [v_2(x, y-1, z) + v_1(x, y, z)]/2 & v_1(x, y-1, z) \in Nc(x, y, z) \\ v_1(x, y, z), & v_1(x, y-1, z) \notin Nc(x, y, z) \end{cases}, \quad (16)$$

where $v_2$ is the second new brightness of the pixel is based on (1) the second new brightness of an adjacent pixel in the same column in the frame and (2) the first new brightness of the pixel, and (x, y−1, z) are the coordinates of the adjacent pixel in the same column.

In essence, the difference in brightness of the current pixel and the adjacent pixel in the same column is determined. If the difference is less than 2σ, then the average brightness of the current pixel and the adjacent pixel is set as the second new brightness of the pixel. Otherwise, the second new brightness of the pixel is set equal to the first new brightness of the pixel determined in step 402.

In step 406, the temporal filter is applied to the current pixel. The temporal filter is applied as follows:

$$v_3(x, y, z) = \begin{cases} [v_3(x, y, z-1) + v_2(x, y, z)]/2, & v_2(x, y, z-1) \in Nc(x, y, z) \\ v_2(x, y, z), & v_2(x, y, z-1) \notin Nc(x, y, z) \end{cases}, \quad (17)$$

where $v_3$ is a third new brightness of the pixel based on (1) the third new brightness of an adjacent pixel at the same column and row in the preceding frame and (2) the second new brightness of the pixel, and (x, y, z−1) are the coordinates of the adjacent pixel at the same column and row in the preceding frame.

In essence, the difference in brightness of the current pixel and the adjacent pixel at the same column and row in the preceding frame is determined. If the difference is less than 2σ, then the average brightness of the current pixel and the adjacent pixel is set as the third new brightness of the pixel. Otherwise, the third new brightness of the pixel is set equal to the second new brightness of the pixel determined in step 404. The third new brightness is the final modified brightness of the pixel.

In step 408, it is determined if the current pixel is the last pixel in the current frame. If not, then step 408 is followed by step 410 and method 400 is repeated until all the pixels in the current frame have been processed. Otherwise step 408 is followed by step 412, which ends method 400. In one embodiment, the pixels are processed in a right to left and then down raster sequence.

Various other adaptations and combinations of features of the embodiments disclosed are within the scope of the invention. For example, the methods described above may be implemented in hardware and may operate on a different color space. Numerous embodiments are encompassed by the following claims.

What is claimed is:

1. A method for enhancing a video, comprising:
   (1) determining parameters for a linear histogram stretch to be applied to pixels in a first frame;
   (2) applying the linear histogram stretch to the pixels in the first frame with the parameters determined for the first frame;
   (3) determining a difference in histogram properties between the first frame and a second frame;
   (4) if the difference is less than a first threshold, applying the linear histogram stretch to pixels in the second frame with the parameters determined for the first frame.

2. The method of claim 1, wherein:
   the parameters for the linear histogram stretch comprises:

$$a = \frac{255}{\max - \min},$$

$$b = -a \cdot \min,$$

wherein a and b are the parameters for the linear histogram stretch, max is a maximum brightness above which pixels in a frame are set to a maximum brightness, and min is a minimum brightness below which pixels in the frame are set to a minimum brightness;

the linear histogram stretch comprises:

$$Y = a \cdot Y_0 + b,$$

wherein Y is a new brightness of a pixel in a frame, and $Y_0$ is an original brightness of the pixel;

the difference in histogram properties between the first frame and a second frame comprises:

$$\Delta P = |P_1 - P_0| / P_0,$$

$$P = \sum_{j=o}^{255} p_j \cdot |j - \text{mean}|,$$

wherein $\Delta P$ is the difference, $P_1$ is a histogram property of the second frame, $P_0$ is a histogram property of the first frame, P is a histogram property of a frame, $p_j$ is a total number of pixels with a brightness of j in a frame, and mean is a mean brightness in the frame.

3. The method of claim 2, wherein the first threshold is 0.02.

4. The method of claim 2, further comprising:
(5) if the difference in the histogram properties between the first frame and the second frame is greater than the first threshold:
 (a) determining the parameters a and b for the linear histogram stretch to be applied to the pixels in the second frame;
 (b) determining a change in the parameter a between the first frame and the second frame;
 (c) if the difference is less than a second threshold and the change is less than a third threshold, applying the linear histogram stretch to the pixels in the second frame with the parameters a and b determined for the second frame;
 (d) if the difference is greater than the second threshold or the change is greater than the third threshold, applying the linear histogram stretch to the pixels in the second frame with the parameters a and b determined for the first frame.

5. The method of claim 4, wherein the first threshold is 0.02, the second threshold is 0.2, and the third threshold is 0.15.

6. The method of claim 4, wherein the linear histogram stretch further comprises stretching color components of the pixels.

7. The method of claim 6, wherein said stretching color components comprises:

$$Cr = a \cdot Cr_0,$$

$$Cb = a \cdot Cb_0,$$

wherein Cr is a new red chrominance, $Cr_0$ is an original red chrominance, Cb is a new blue chrominance, $Cb_0$ is an original blue chrominance.

8. The method of claim 1, wherein max and min are set so that a first percentage of a total number of pixels in the frame will be set to the maximum brightness and a second percentage of the total number of pixels in the frame will be set to the minimum brightness.

9. The method of claim 8, wherein the first percentage and the second percentage are 1%.

10. The method of claim 1, further comprising:
determining an optimal gamma for a gamma correction to be applied to the pixels in the first frame, the optimal gamma maximizing an entropy of the first frame; and
applying the gamma correction to the pixels in the first frame with the optimal gamma determined for the first frame.

11. The method of claim 10, wherein:
the entropy comprises:

$$E = \sum_{j=1}^{255} P_j \cdot \gamma \cdot \left(\frac{j+1}{256}\right)^{\gamma-1},$$

wherein E is the entropy of a frame after enhancement, j is brightness, $P_j$ is a percentage of pixels in the frame having brightness j prior to enhancement, and $\gamma$ is a variable gamma used to determine the optimal gamma;
the gamma correction comprises:

$$Y = 255 \cdot \left(\frac{Y_0}{255}\right)^{\gamma_1},$$

wherein Y is a new brightness of a pixel in a frame, $Y_0$ is an original brightness of the pixel, and $\gamma_1$ is the optimal gamma.

12. The method of claim 11, wherein said determining an optimal gamma comprises searching in a first range for the optimal gamma that maximizes the entropy of the first frame.

13. The method of claim 12, wherein the range comprises 0.65 to 1.2.

14. The method of claim 12, further comprising:
determining a change in mean values of brightness between the first frame and the second frame;
determining the optimal gamma for the gamma correction to be applied to the pixels in the second frame, wherein said determining the optimal gamma comprises searching in a second range that is smaller than the first range for the optimal gamma that maximizes the entropy of the second frame;
applying the gamma correction to the pixels in the second frame with the optimal gamma determined for the second frame.

15. The method of claim 14, wherein the second range comprises:

$$[\gamma_0 - \Delta m \cdot 0.02, \gamma_0 + \Delta m \cdot 0.02],$$

wherein $\gamma_0$ is the optimal gamma determined for the first frame, and $\Delta m$ is the change in the mean values of brightness between the first frame and the second frame.

16. The method of claim 1, further comprising:
applying a sigma row filter a pixel in a frame;
applying a sigma column filter to the pixel;
applying a sigma temporal filter to the pixel;
repeating said applying the sigma row filter, the sigma column filter, and the sigma temporal filter to each of remaining pixels in the frame.

17. The method of claim 16, wherein said applying a sigma row filter comprises:
determining a difference in brightness between the pixel and an adjacent pixel located in the same row in the frame; and
if the difference is less than a threshold, then setting a brightness of the pixel to the average of the brightness of the pixel and the adjacent pixel in the same row in the frame.

18. The method of claim 17, wherein said applying a sigma column filter comprises:

determining a difference in brightness between the pixel and an adjacent pixel located in the same column in the frame; and if the difference is less than the threshold, then setting the brightness of the pixel to the average of the brightness of the pixel and the adjacent pixel in the same column in the frame.

19. The method of claim 18, wherein said applying a sigma temporal filter comprises:

determining a difference in brightness between the pixel and an adjacent pixel located at the same row and column in a preceding frame; and if the difference is less than the threshold, then setting the brightness of the pixel to the average of the brightness of the pixel and the adjacent pixel located at the same row and column in the preceding frame.

20. The method of claim 16, wherein said applying a sigma row filter comprises:

$$v_1(x, y, z) = \begin{cases} [v_1(x-1, y, z) + v(x, y, z)]/2, & v(x-1, y, z) \in Nc(x, y, z) \\ v(x, y, z), & v(x-1, y, z) \notin Nc(x, y, z) \end{cases},$$

$$v(l, m, n) \in Nc(x, y, z) \text{ if } |v(l, m, n) - v(x, y, z)| < 2\sigma,$$

wherein $v_1$ is a first brightness of the pixel in the frame based on (1) an original brightness of the pixel and (2) the first brightness of an adjacent pixel in the same row in the frame, (x, y, z) are coordinates of the pixel, (x−1, y, z) are the coordinates of the adjacent pixel in the same row, (l, m, n) are variables coordinates, Nc is set of pixels that have a brightness difference with the pixel less than a threshold $2\sigma$.

21. The method of claim 20, wherein said applying a sigma column filter comprises:

$$v_2(x, y, z) = \begin{cases} [v_2(x, y-1, z) + v_1(x, y, z)]/2, & v_1(x, y-1, z) \in Nc(x, y, z) \\ v_1(x, y, z), & v_1(x, y-1, z) \notin Nc(x, y, z) \end{cases},$$

wherein $v_2$ is a second brightness of the pixel based on (1) the second brightness of an adjacent pixel in the same column in the frame and (2) the first brightness of the pixel, and (x, y−1, z) are the coordinates of the adjacent pixel in the same column.

22. The method of claim 21, wherein said applying a sigma temporal filter comprises:

$$v_3(x, y, z) = \begin{cases} [v_3(x, y, z-1) + v_2(x, y, z)]/2, & v_2(x, y, z-1) \in Nc(x, y, z) \\ v_2(x, y, z), & v_2(x, y, z-1) \notin Nc(x, y, z) \end{cases},$$

wherein $v_3$ is a third brightness of the pixel based on (1) the third brightness of an adjacent pixel at the same column and row in a preceding frame and (2) the second brightness of the pixel, and (x, y, z−1) are the coordinates of the adjacent pixel at the same column and row in the preceding frame.

23. A method for enhancing a video, comprising:

(1) applying a linear histogram stretch, comprising:
 (a) determining parameters for a linear histogram stretch to be applied to pixels in a first frame;
 (b) applying the linear histogram stretch to the pixels in the first frame with the parameters determined for the first frame;
 (c) determining a difference in histogram properties between the first frame and a second frame;
 (d) if the difference is less than a first threshold, applying the linear histogram stretch to the pixels in the second frame with the parameters determined for the first frame;
 (e) if the difference in the histogram properties between the first frame and the second frame is greater than the first threshold:
  (i) determining the parameters a and b for the linear histogram stretch to be applied to the pixels in the second frame;
  (ii) determining a change in the parameter a between the first frame and the second frame;
  (iii) if the difference is less than a second threshold and the change is less than a third threshold, applying the linear histogram stretch to the pixels in the second frame with the parameters a and b determined for the second frame;
  (iv) if the difference is greater than the second threshold or the change is greater than the third threshold, applying the linear histogram stretch to the pixels in the second frame with the parameters a and b determined for the first frame;

(2) applying a gamma correction, comprising:
 (a) determining an optimal gamma for a gamma correction to be applied to the pixels in the first frame, the optimal gamma maximizing an entropy of the first frame;
 (b) applying the gamma correction to the pixels in the first frame with the optimal gamma determined for the first frame;
 (c) determining a change in mean values of brightness between the first frame and the second frame;
 (d) determining the optimal gamma for the gamma correction to be applied to pixels in the second frame, wherein said determining the optimal gamma comprises searching in a second range that is smaller than the first range for the optimal gamma that maximizes the entropy of the second frame;
 (e) applying the gamma correction to the pixels in the second frame with the optimal gamma determined for the second frame;

(3) applying sigma filters, comprising:
 (a) applying a row sigma filter, comprising:
  (i) determining a difference in brightness between a pixel and an adjacent pixel located in the same row in a frame;
  (ii) if the difference is less than a threshold, then setting a brightness of the pixel to the average of the brightness of the pixel and the adjacent pixel in the same row in the frame;
 (b) applying a column sigma filter, comprising:
  (i) determining a difference in brightness between the pixel and an adjacent pixel located in the same column in the frame;
  (ii) if the difference is less than the threshold, then setting the brightness of the pixel to the average of the brightness of the pixel and the adjacent pixel in the same column in the frame;
 (c) applying a temporal sigma filter, comprising:
  (i) determining a difference in brightness between the pixel and an adjacent pixel located at the same row and column in a preceding frame;
  (ii) if the difference is less than the threshold, then setting the brightness of the pixel to the average of the brightness of the pixel and the adjacent pixel located at the same row and column in the preceding frame.

* * * * *